United States Patent [19]

Kubens et al.

[11] 4,162,357

[45] Jul. 24, 1979

[54] PROCESS FOR THE PRODUCTION OF SYNTHETIC RESINS CONTAINING ISOCYANURATE GROUPS

[75] Inventors: Rolf Kubens, Odenthal; Heinrich Heine, Leverkusen, both of Fed. Rep. of Germany

[73] Assignee: Bayer Aktiengesellschaft, Leverkusen, Fed. Rep. of Germany

[21] Appl. No.: 901,534

[22] Filed: May 1, 1978

[30] Foreign Application Priority Data

May 17, 1977 [DE] Fed. Rep. of Germany ....... 2722400

[51] Int. Cl.² .............................................. C08G 18/02
[52] U.S. Cl. ........................................................ 528/67
[58] Field of Search ............................................ 528/67

[56] References Cited

U.S. PATENT DOCUMENTS 3,362,979  1/1968  Bentley ........................ 260/570 D
3,711,444  1/1973  Allen et al. ........................ 528/67

Primary Examiner—Maurice J. Welsh
Attorney, Agent, or Firm—Gene Harsh; Joseph C. Gil; R. Brent Olson

[57] ABSTRACT

The instant invention is directed to a process for the production of heat-resistant synthetic resins containing isocyanurate groups by the polymerization of organic polyisocyanates in the presence of catalysts which accelerate the trimerization of isocyanate groups, wherein said polyisocyanate component is a mixture of isomers and/or homologs of polyisocyanates of the diphenylmethane series containing more than 20%, by weight, of 2,4'-diisocyanatodiphenylmethane.

10 Claims, No Drawings

PROCESS FOR THE PRODUCTION OF SYNTHETIC RESINS CONTAINING ISOCYANURATE GROUPS

BACKGROUND OF THE INVENTION

This invention relates to a new process for the production of synthetic resins containing isocyanurate groups by the polymerization of certain polyisocyanates of the diphenylmethane series which are described in more detail below. If desired, the reaction mixture used for producing these synthetic resins may also contain polymerizable monomers, organic epoxides or subequivalent quantities of compounds which contain isocyanate-reactive hydrogen atoms.

It is known that synthetic resins containing isocyanurate groups may be produced by the trimerization of the isocyanate groups of polyisocyanates in the presence of ethylenically unsaturated compounds (German Offenlegungsschrift No. 2,432,952) or in the presence of epoxides (German Offenlegungsschrift No. 2,359,386). The polyisocyanates which have been proposed for this purpose include, inter alia, diphenylmethane-4,4'-diisocyanate or mixtures of this diisocyanate with higher nuclear polyisocyanates of the diphenylmethane series. One disadvantage of using diphenylmethane-4,4'-diisocyanate is that the mixtures obtained are insufficiently reactive so that solid products are obtained only at high temperatures. Side reactions accompanied by the evolution of carbon dioxide which causes bubbles and blistering of the molded articles cannot be completely suppressed. The high temperatures required for hardening cause severe shrinkage in the cast products.

The same difficulties occur when commercial mixtures of diphenylmethane-4,4'-diisocyanate with higher nuclear polyisocyanates of the diphenylmethane series are used. The mixtures are relatively inert and require high temperatures for hardening. This causes high shrinkage in the cast product. Side reactions, accompanied by the liberation of carbon dioxide, cause gas bubbles in the cast products. Moreover, the resultant products are brittle. The viscosity of the starting materials is relatively high, making any impregnation more difficult and having a deleterious effect on the uptake of any filler.

It was therefore an object of the present invention to provide a new process for the production of heat-resistant synthetic resins, which process would not have the disadvantages mentioned above.

DESCRIPTION OF THE INVENTION

To solve this problem according to the present invention, the polyisocyanate component used for the production of synthetic resins containing isocyanurate groups by the polymerization of polyisocyanates in the presence of catalysts which accelerate the trimerization reaction of isocyanate groups are polyisocyanates of the diphenylmethane series containing more than 20%, by weight, of 2,4'-diisocyanatodiphenylmethane. Mixtures of such polyisocyanates with basic trimerization catalysts and optionally ethylenically unsaturated compounds and/or organic epoxides and/or subequivalent quantities of compounds containing isocyanate-reactive hydrogen atoms have the following advantages:

(1) They have a lower viscosity, which ensures a high uptake of filler and renders them suitable for impregnation.

(2) The hardening reaction proceeds at a sufficiently high velocity at low temperatures, in many cases even at room temperature.

(3) Tempering is not accompanied by any side reactions which could lead to the formation of bubbles due to the liberation of carbon dioxide and hence destruction of the molded material.

(4) Due to the low solidification or setting temperature required, the shrinkage in the cast product is low.

(5) The molded products produced by this process have very good mechanical properties and excellent heat resistance.

These findings were completely unexpected and could not be foreseen by those skilled in the art since it is well known that 2,4'-diisocyanatodiphenylmethane is less reactive in the isocyanate addition reaction with organic hydroxyl compounds than the corresponding 4,4'-isomer (Lottanti and Schiegg, Kunststoffe-Plastics, 2 1976, page 19; Baygal-Baymidur-Polyurethan-Giessharze, publication by Bayer AG, edition 1.11.1974, Order No. KL 43.006, page 15). It was therefore to be expected that 2,4'-diisocyanatodiphenylmethane would also be less reactive than 4,4'-diisocyanatodiphenylmethane in the trimerization reaction. Thus, the higher reaction velocity in the process according to the present invention which will be described below must be regarded as particularly surprising.

The present invention thus relates to a process for the manufacture of heat-resistant synthetic resins containing isocyanurate groups by the polymerization of organic polyisocyanates in the presence of catalysts which accelerate the trimerization of isocyanate groups, optionally in the presence of polymerizable, olefinically unsaturated monomers and/or in the presence of organic compounds containing epoxide groups and/or in the presence of sub-equivalent quantities, based on the number of isocyanate groups of the polyisocyanate component, of compounds which have isocyanate-reactive hydrogen atoms, characterized in that the polyisocyanate component used is a mixture of isomers and/or homologs of polyisocyanates of the diphenylmethane series containing more than 20%, by weight, of 2,4'-diisocyanatodiphenylmethane.

The polyisocyanate component which is an essential feature of the present invention comprises polyisocyanate mixtures of the diphenylmethane series containing more than 20%, by weight, and preferably from 30 to 70%, by weight, of 2,4'-diisocyanatodiphenylmethane. In addition to the 2,4'-isomer, the polyisocyanate component generally also contains other isomeric or homologous polyisocyanates of the diphenylmethane series. This means that the polyisocyanate component which is essential to the present invention generally consists either of mixtures of 2,4'-diisocyanatodiphenylmethane with 4,4'-diisocyanatodiphenylmethane and from 0 to 20%, by weight, based on the total mixture, of 2,2'-diisocyanatodiphenylmethane, or mixtures of these isomers with higher nuclear polyphenyl-polymethylene polyisocyanates. The last-mentioned mixtures generally contain from 10 to 60%, by weight, of such higher nuclear polyisocyanates, based on the total quantity of mixture. The first-mentioned mixture which is suitable for use as polyisocyanate component may be obtained, for example, by distilling a diisocyanate mixture of the given composition from a polyisocyanate mixture obtained by the phosgenation of aniline/formaldehyde condensates. The other mixture suitable for the process, which contains higher nuclear polyisocyanates, may be obtained, for example, by returning the last-mentioned distillation product to a phosgenation product which has been depleted of 4,4'-diisocyanatodiphenylmethane, for example as described in German Auslegeschrift No. 1,923,214. A polyisocyanate mixture containing a quantity of 2,4'-diisocyanatodiphenylmethane within the limits required by the present invention, may also be obtained directly by suitably controlling the aniline/formaldehyde condensation.

In U.S. Pat. No. 3,277,173, there has been described a method of obtaining polyamine mixtures of the diphenylmethane series containing a high proportion of 2,4'-diaminodiphenylmethane. The polyisocyanates suitable for the process according to the present invention may be directly obtained by phosgenating these condensates which are rich in 2,4'-diaminodiphenylmethane. Other methods of obtaining such polyisocyanate mixtures have also been described in German Offenlegungsschrift No. 1,937,685 and in U.S. Pat. No. 3,362,979.

In the polyisocyanate mixtures which are suitable which contain higher nuclear polyisocyanates of the diphenylmethane series, the 2,4'-diisocyanatodiphenylmethane content is also higher than 20%, by weight, based on the total mixture.

The catalysts used for trimerizing the isocyanate groups in the process may be any inorganic or organic substances known to accelerate the trimerization of isocyanate groups, e.g. those described by J. H. Saunders and K. C. Frisch in "Polyurethanes Chemistry and Technology", Interscience Publishers, New York (1962) on pages 94 et seq; in German Offenlegungsschriften Nos. 1,667,309; 1,909,573; 1,946,007 and 2,325,826, in U.S. Pat. No. 3,878,662 or in U.S. patent application No. 737,747. The catalysts preferably used in the process are substances which are basic in reaction, e.g. alkali metal salts of weak organic acids, such as sodium acetate or potassium acetate, tertiary phosphines, such as triethylphosphine, and tertiary amines, such as those exemplified below, or Mannich bases, e.g. according to U.S. patent application No. 737,747. Particularly preferred trimerization catalysts for the purposes of the present invention, apart from the last-mentioned Mannich bases, are those based on a phenol, formaldehyde and a secondary amine, such as dimethylamine, diethanolamine or methyl ethanolamine, or any tertiary amines having aliphatically, cycloaliphatically or araliphatically bound tertiary amine nitrogen atoms, e.g. trimethylamine, triethylamine, N,N,N',N'-tetramethyl-tetramethylene diamine, N,N-dimethylbenzylamine or N,N-dimethylcyclohexylamine.

In addition to the polyisocyanate component and the trimerization catalysts, the reaction mixtures used in the process may also contain the following reactive components:

(1) Polymerizable, olefinically unsaturated monomers, in quantities of from 0.1 to 100%, by weight, and preferably from 2 to 50%, by weight, based on the polyisocyanate component;

(2) organic epoxides, in quantities of from 0.1 to 100%, by weight, and preferably from 2 to 50%, by weight, based on the polyisocyanate component; and (3) organic compounds containing isocyanate reactive hydrogen atoms, in quantities corresponding to an equivalent ratio of isocyanate groups to active hydrogen atoms of from 0.05 to 0.5, and preferably from 0.1 to 0.4.

The use of compounds mentioned under (1) and (2) are preferred to the use of the compounds containing isocyanate-reactive hydrogen atoms mentioned under (3). The process may be carried out using two or even all three types of compounds.

When olefinically unsaturated monomers are used, and particularly when the preferred, basic catalysts are used at the same time, it is generally possible, although not necessary, to also use the classic known polymerization initiators, such as benzoyl peroxide. The olefinically unsaturated monomers used are preferably those which have no isocyanate-reactive hydrogen atoms. Examples include, e.g., diisobutylene, styrene, $C_1$ to $C_4$ alkylstyrenes, such as α-methylstyrene and α-butylstyrene, vinyl chloride, vinyl acetate, $C_1$–$C_8$ alkyl esters of acrylic acid, such as methyl acrylate, butyl acrylate or octyl acrylate, the corresponding methacrylic acid esters, acrylonitrile or diallylphthalate. Mixtures of such olefinically unsaturated monomers may also be used. Styrene and/or $C_1$–$C_4$ alkyl esters of (meth)acrylic acid are preferably used.

The epoxides optionally used are preferably organic compounds containing at least two epoxy groups which are known from the chemistry of epoxide resins. Examples of such epoxides have been described in, for example, German Offenlegungsschrift No. 2,359,386, British Pat. No. 1,182,377 and U.S. Pat. No. 4,014,771, the disclosures of which are herein incorporated by reference. A particularly preferred epoxide is the diglycidyl ether of bisphenol A.

The compounds containing isocyanate-reactive hydrogen atoms optionally used are known and are mainly organic compounds having molecular weights of from 62 to 2000 and containing from 2 to 8, preferably 2 or 3, alcoholic hydroxyl groups which are known for the synthesis of polyurethanes. Examples include simple polyhydric alcohols, such as ethylene glycol, hexamethylene glycol, glycerol and trimethylol propane; polyhydroxyl compounds containing ester groups, such as castor oil, or polyhydroxypolyesters of the type which may be obtained by the polycondensation of excess quantities of simple polyhydric alcohols of the type just mentioned with dibasic carboxylic acids or the anhydrides thereof, such as adipic acid, phthalic acid or phthalic acid anhydride; polyhydroxylpolyethers which may be obtained by the chemical addition of alkylene oxides, such as propylene oxide and/or ethylene oxide, to suitable starter molecules, e.g. to water, to the simple alcohols just mentioned above or to amines which have at least two aminic NH bonds.

In addition to the reactants and catalysts mentioned above, other auxiliary agents and additives, such as fillers, pigments or plasticizers, may also be used when carrying out the process.

Examples of suitable fillers include quartz powder, chalk and aluminum oxide.

Examples of suitable pigments include: titanium dioxide, iron oxide and organic pigments, such as phthalocyanine pigments.

Examples of suitable plasticizers include: dioctylphthalate, tributylphosphate and triphenylphosphate.

Soluble dyes or reinforcing materials, such as glass fibers or fabrics, may also be used.

The starting materials and auxiliary agents and additives are preferably mixed together at temperatures of from 0° to 100° C., and preferably from 20° to 60° C. When the components have been mixed, the mixture is hardened at temperatures of from 20° to 150° C., preferably from 20° to 60° C. for about 45 to 5 minutes. If desired, the product may subsequently be afterhardened or tempered at temperatures of from 150° to 250° C., preferably from 200° to 230° C. for about 24 to 15 hours, for the purpose of obtaining optimum properties in the products.

The process is suitable for the production of heat-resistant synthetic resins, in particular in the form of molded articles, coatings and bonding agents or adhesives of various types. The process may also be used for the production of immersion compounds or impregnating compounds used for electric insulations or for glass fiber-reinforced laminates. The mixtures prepared in the process may also be used as casting compounds and pourable sealing compounds, particularly for the manufacture of electrical parts.

EXAMPLES

Example 1

For the manufacture of cast resin parts, 100 parts, by weight, of the polyisocyanates described below are mixed with 1 part, by weight, of 2,4,6-tris-(dimethylaminomethyl)-phenol as trimerization catalyst at room temperature or at 60° C. with vigorous stirring:

(A): Polyisocyanate mixture of the diphenylmethane series containing 40%, by weight, of 4,4'-diisocyanatodiphenylmethane, 15%, by weight, of 2,4-diisocyanatodiphenylmethane and 45%, by weight of trinuclear and higher nuclear polyisocyanates of the diphenylmethane series. The mixture has a viscosity of 150 mPas at 25° C. and an isocyanate content of 31.6%, by weight.

(B): Polyisocyanate mixture of the diphenylmethane series consisting of 50%, by weight, of 4,4'-diisocyanatodiphenylmethane and 50%, by weight, of trinuclear and higher nuclear polyisocyanates of the diphenylmethane series. The polyisocyanate mixture has a viscosity of 230 mPas at 25° C. and an isocyanate content of 30.7%, by weight.

(C): 4,4'-diisocyanatodiphenylmethane, melting point 45° C.; viscosity 14 mPas at 60° C.; isocyanate content: 33.6%, by weight.

(D): Mixture of 60%, by weight, of 2,4'-diisocyanatodiphenylmethane and 40%, by weight, of 4,4'-diisocyanatodiphenylmethane. The mixture has a viscosity of 15 mPas at 25° C. and an isocyanate content of 33.5%, by weight.

The mixtures containing isocyanates (A) and (B) (at room temperature) and (C) (at 60° C.) undergo hardly any change in viscosity when left to stand for 24 hours; only a thin film forms on the surface due to the action of atmospheric moisture.

By contrast, the mixture containing isocyanate (D) begins to react with vigorous evolution of heat shortly after it has been stirred together and solidifies within about 30 minutes.

Example 2

100 parts, by weight, of each of the polyisocyanates described in Example 1 were mixed in each case with 10 parts, by weight, of an epoxide resin based on 2,2-bis-(4-hydroxyphenyl)-propane and epichlorohydrin having a viscosity of 8000 mPas at 25° C. and containing 5.7 epoxide equivalents per kilogram and which has been prepared by condensing bis-phenol A with epichlorohydrine in the presence of aqueous sodium hydroxide. The mixtures obtained have the following viscosities:

Isocyanate (A): 137 mPas at 25° C.
Isocyanate (B): 318 mPas at 25° C.
Isocyanate (C): 19.5 mPas at 25° C.

Without the addition of catalyst, all the mixtures will keep for several days at room temperature without showing any increase in viscosity.

After the addition of 1 part, by weight, of dimethylbenzylamine as catalyst, the mixtures solidify at room temperature. The system containing isocyanate (D) solidifies within about 15 minutes and the reaction is vigorously exothermic. The systems containing isocyanates (A) and (B) solidify within 4 hours and 8 hours, respectively, without substantial evolution of heat.

When the mixture containing isocyanate (C) as catalyst is kept at 60° C., it crystallizes on cooling to room temperature. No increase in viscosity is observed over a period of 24 hours.

The castings obtained by pouring the reactive mixtures into aluminum molds 20×30×0,4 cm in size obtained from isocyanate (A) and isocyanate (B) are black in color, those obtained from isocyanate (D) are amber colored and translucent.

When the casting produced with isocyanate (D) is after-hardened at 250° C. for 16 hours, it is dark on its surface, but pale brown in its interior. The fracture surfaces are smooth.

The castings obtained using isocyanates (A) and (B) are black after they have been stored in the heat. The fracture surface of the isocyanate (A) casting is shell shaped and that obtained with isocyanate (B) is crazed.

Example 3

The mixtures of polyisocyanates, epoxide resin and dimethylbenzylamine as catalyst described in Example 2 were poured into an aluminum plate mold treated with mold release agent (polytetrafluoroethylene which has been sintered onto the surface of the plate) and initially hardened at room temperature. When the mixtures had set, the thus-obtained plates were heated to 120° C. for 10 hours and then removed from the molds. They were then after-hardened at 180° C. for 16 hours.

The test plates produced in this way were used to determine the following properties:

Test plate containing isocyanate

|  |  | (A) | (B) | (D) |
| --- | --- | --- | --- | --- |
| Flexural strength (MPa) | (DIN 53452) | 47 | 69 | 125 |
| Sagging (mm) | (DIN 53452) | 1.1 | 1.5 | 4.4 |
| Impact strength (kJ/m²) | (DIN 53453) | 2.2 | 3.0 | 12.0 |
| Martens degree (°C.) | (DIN 53458) | >250 | >250 | >250 |

Although the mixture containing isocyanate (C) solidifed during the heat treatment, the plates obtained cracked when removed from the mold. The material was brittle and therefore could not be tested.

Example 4

To test the reactivity, the polyisocyanates mentioned in Example 1 were mixed with 40 parts, by weight, of styrene and with 20 parts, by weight, of an epoxide resin based on 2,2-bis-(4-hydroxyphenyl)-propane and epichlorohydrin having a viscosity of 8000 mPas at 25° C. and containing 5.7 epoxide equivalents per kilogram. The viscosities of these various mixtures measured at 25° C. were as follows:

Isocyanate (A): 15 mPas
Isocyanate (B): 17 mPas
Isocyanate (C): 10 mPas

Isocyanate (D): 10 mPas

No increase in viscosity was measured when these mixtures were kept at room temperature for 24 hours.

The mixtures described above were catalyzed by the addition of 1 part, by weight, of dimethylbenzylamine to each mixture. The system containing isocyanate (D) solidified within 50 minutes with evolution of heat. The mixture containing isocyanate (B) solidified within 48 hours and that containing isocyanate (A) within 3 days. The mixture containing isocyanate (C) could not be solidified even when left to react for one week at room temperature.

Example 5

The catalyst-containing mixtures described in Example 4 were poured at room temperature into aluminum plate molds which had been treated with mold release agent as explained in example 3. To increase the reactivity, the molds were placed in a heating cupboard after the mixtures had been poured into them and the temperature was raised at the rate of 10° C. per hour. When the temperature reached 130° C., the castings containing isocyanates (A), (B) and (D) had solidified and could be removed from the molds.

After an additional heat treatment at 250° C. carried out for 16 hours, the following mechanical properties could be determined on the castings:

|  | Isocyanate | (A) | (B) | (D) |
|---|---|---|---|---|
| Flexural strength (MPa) | (DIN 53452) | 40 | 54 | 102 |
| Deflection (mm) | (DIN 53452) | 0.9 | 1.2 | 3.5 |
| Impact strength (kJ/m$^2$) | (DIN 53453) | 1.4 | 3.2 | 18 |
| Martens degree (°C.) | (DIN 53458) | 235 | 232 | >250 |

The system containing isocyanate (C) had not solidified sufficiently by the time the temperature reached 130° C. to be able to be removed from its mold without damage. The tests therefore could not be carried out on it.

Example 6

24 layers of a smooth glass fabric weighing 120 g/cm$^2$ and having the same quantity of glass in the direction of the warp as in the weft were placed between two aluminum plates which had been treated with mold release agent as explained in example 3 and the stack of layers was compressed to a thickness of 4 mm by means of a frame. The glass fabric was impregnated under a vacuum of from 10 to 20 Torr with a resin mixture consisting of 100 parts, by weight, of the polyisocyanate (D) according to Example 1 and 5 parts, by weight, of an epoxide resin based on 2,2-bis-(4-hydroxyphenyl)-propane and epichlorohydrin having a viscosity of approximately 8000 mPas at 25° C. and containing 5.7 epoxide equivalents per kilogram, 30 parts, by weight, of styrene and 2 parts, by weight, of dimethylbenzylamine. After ventilation, the plate was hardened in an oven in which the temperature was raised from 60° C. to 140° C. at the rate of 10° C. per hour. After this hardening treatment, the laminate could be removed from the mold and was found to be free from pitting. For complete hardening, the product was then tempered for a further 16 hours at 250° C.

The following mechanical properties could be determined on this laminate:

| Tensile strength (MPa) | (DIN 53455) | 171.0 |
|---|---|---|
| Compression resistance (MPa) | (DIN 53454) | 194.3 |
| Flexural strength (MPa) at RT | (DIN 53452) | 316.6 |
| Flexural strength (MPa) at 60° C. | | 303.0 |
| Flexural strength (MPa) at 100° C. | | 276.8 |
| Flexural strength (MPa) at 140° C. | | 260.3 |
| Flexural strength (MPa) at 180° C. | | 247.8 |

Example 7

A mixture of 100 parts, by weight, of polyisocyanate (D) described in Example 1 was mixed with 20 parts, by weight, of styrene, 5 parts, by weight, of an epoxide resin based on 2,2-bis-(4-hydroxyphenyl)-propane and epichlorohydrin having a viscosity of approximately 8000 mPas at 25° C. and containing 5.7 epoxide equivalents per kilogram and 0.5 parts, by weight, of dimethylbenzylamine as polymerization catalyst. 190 parts, by weight, of quartz powder were subsequently added and mixed in. The reaction mixture was then degasified under a vacuum of approximately 20 mbar for 15 minutes. The highly fluid mass obtained was poured into an aluminum mold which had been treated with mold release agent as explained in example 3 and it was hardened in this mold for 4 hours at 80° C., for 4 hours at 120° C. and for 4 hours at 160° C. It could then be removed from the mold as a homogeneous plate which was subsequently after-hardened for 16 hours at 230° C.

The plate was cut up into standard test rods measuring 10×15×120 mm which were stored in a heating cupboard at 250° C. for 2, 7 and 14 days, respectively. After this ageing by heat, the weight loss and flexural strength were determined. The following results were obtained:

|  | Flexural strength according to DIN 53 452 | Weight loss |
|---|---|---|
| Fresh samples | 115 MPa | — |
| 2 days | 115 MPa | 0.46% |
| 7 days | 115 MPa | 0.48% |
| 14 days | 115 MPa | 1.25% |

Example 8

A mold in the form of a pin insulator which had been treated with mold release agent as explained in example 3 and into which the appropriate steel reinforcements had been placed was filled with a casting resin composition prepared by a method analogous to that described in Example 7. Hardening was also carried out as described in Example 7. When the rod insulator had been hardened, removed from the mold and after-hardened, it was tested to determine the force required to snap it at room temperature. Other parts produced by the same method were used to test the snapping force at 150° C. The following results were obtained:

| Snapping force at room temperature | 360 kp |
|---|---|
| Snapping force at 150° C. | 310 kp |

What is claimed is:

1. In a process for the production of heat-resistant synthetic resins containing isocyanurate groups by the polymerization of organic polyisocyanates in the presence of catalysts which accelerate the trimerization of isocyanate groups, the improvement wherein said polyisocyanate component is a mixture of isomers and/or homologs of polyisocyanates of the diphenylmethane series containing more than 20%, by weight, of 2,4'-diisocyanatodiphenylmethane.

2. The process of claim 1 wherein said polymerization reaction is conducted in the presence of a member selected from the group consisting of polymerizable olefinically unsaturated monomers, organic compounds which have epoxide groups, sub-equivalent quantities, based on the number of isocyanate groups in the polyisocyanate component, of compounds which have isocyanate-reactive hydrogen atoms, and mixtures thereof.

3. The process of claim 2 wherein said polymerizable olefinically unsaturated monomers are used in quantities of from 2 to 50%, by weight, based on the polyisocyanate component.

4. The process of claim 2 wherein said organic epoxides are used in quantities of from 2 to 50%, by weight, based on the polyisocyanate component.

5. The process of claim 2 wherein said organic compounds containing isocyanate-reactive hydrogen atoms are used in quantities corresponding to an equivalent ratio of isocyanate groups to active hydrogen atoms of from 0.05 to 0.5.

6. The process of claim 5 wherein said organic compounds containing isocyanate-reactive hydrogen atoms have molecular weights of from 62 to 2000 and contain from 2 to 8 alcoholic hydroxyl groups.

7. The process of claim 2 wherein said polyisocyanate component contains 30 to 70%, by weight, of 2,4'-diisocyanatodiphenylmethane.

8. The process of claim 7 wherein said polyisocyanate component contains 0 to 20%, by weight, of 2,2'-diisocyanatodiphenylmethane.

9. The process of claim 1 wherein said components are mixed at a temperature of from 0° to 100° C., the temperature is held at 20° to 150° C. during hardening, and raised to 150° to 250° C. during after-hardening.

10. The process of claim 9 wherein said components are mixed and hardened at a temperature of from 20° to 60° C. and then the temperature is raised to 200° to 230° C.

* * * * *